Patented Aug. 12, 1924.

1,504,670

UNITED STATES PATENT OFFICE.

JOSEPH BLUMENFELD, OF LONDON, ENGLAND.

TITANIUM COMPOUND.

No Drawing. Application filed April 28, 1924. Serial No. 709,672.

*To all whom it may concern:*

Be it known that I, JOSEPH BLUMENFELD, a citizen of Russia, and residing at London, W. 14, England, have invented certain new and useful Improvements Relating to Titanium Compounds, of which the following is a specification.

The present invention relates to the preparation of crystalline titanyl sulphate and pure titanium oxide of practically constant physical and chemical character from minerals rich in titanium, or from oxide of titanium concentrated by preliminary treatment, or from other sources.

The difficulties which occur in realizing the industrial preparation of titanium oxide of constant and uniform properties, are due to continuous changes going on in a colloidal solution. It is a well known fact that if one tries to dissolve, for example, oxide of titanium or ilmenite in an acid, sulphuric acid for example, no definite solution is obtained, but a whole continuous series of so-called solutions is produced, including the titanium compound in various forms, i. e., in mechanical suspension, in colloidal solutions more and more dispersed, and in crystalloid solution. The intermediate so-called solutions which are produced in practice are constantly in a state of change and have variable properties with reference, first, to filtering qualities; second, stability when diluted; and third, the effect of temperature changes which make continual alterations in the manufacture necessary.

I have now discovered that a true crystalloid solution of titanium, i. e., one of constant properties, can be obtained. This solution can be defined and identified without ambiguity. It does not show the Tyndall effect to any appreciable degree. It does not change with time. When heated below its boiling point, say above 60° C. and below 130° C., at such a dilution that its boiling point does not exceed 130° C., titanyl sulphate in the form of needle-like microscopic crystals is precipitated. The composition of the crystals answers to the formula $TiO\ SO_4\ 2H_2O$. The solutions of this salt are much more stable than the so-called colloidal solutions when diluted with water or other reagents (sulphuric or hydrochloric acid, or sulphate of soda and the like), and, what seems to be of fundamental importance in the manufacture of $TiO_2$ on a large scale, these solutions always yield products of the same physical and chemical properties when treated under the same conditions.

The invention consists in one or more of the following features: (*a*) the conversion of titaniferous material, e. g. ilmenite, indirectly into readily clarifiable crystalloid solutions of titanium basic sulphates which yield titanyl sulphate by crystallization; (*b*) the production of crystalline titanyl sulphate by treatment of solutions of $TiO_2$ in $H_2SO_4$; (*c*) the production of crystalloid solutions of titanium basic sulphates from crystals of titanyl sulphate; (*d*) the production of titanium gels having a practically constant and physical character by hydrolysis of the aforesaid crystalloid solutions in the manner indicated in copending application No. 709,671 filed concurrently herewith.

The invention also consists in the processes and the products produced by the processes herein described and claimed, or by their obvious chemical equivalents.

In carrying the invention into effect, the titaniferous material, for example titanium oxide, is mixed with a quantity of sulphuric acid calculated to obtain in final solution a ratio for 1 part $TiO_2$ of 1.2 to 2.4 parts of sulphuric acid, depending on the acidity of the solution desired. For example, 250-300 kilograms of titanium oxide are mixed with 500 kilograms of sulphuric acid of 80% concentration, or alternatively 400 kilograms of sulphuric acid of 100% concentration might be used if diluted with 100 kilograms of water. It is, however, convenient to use Glover tower acid, which has a concentration of about 80%. The concentration of the sulphuric acid used must not, however, exceed 90%. The whole is stirred and the reaction is effected in one specific case between the temperature of 140° C. and 17° C. though the process can be worked if the temperature of reaction is between a minimum and maximum of 130° C. and 220° C. respectively. It should be observed that the temperature at which the operation is carried out should be above 120° C. and should gradually be increased to at least 140° C. and may be raised to 250° C.

Under these conditions the mass is transformed into a paste which gradually stiffens on heating and has at the end of the operation the appearance of a dry light greyish powder. As the titaniferous material, in this example titanium oxide, is in excess, some of this material may remain unattacked by the acid and may be returned for treatment in the next batch. The greater part of the $TiO_2$ has been converted into a soluble form and in the specific case referred to above, this amounts to about 220-270 kilograms soluble $TiO_2$. The mass is cooled and then dissolved by treating with water for a period of from one to four hours, depending on the state of division and the amount of stirring. The volume of water used in this treatment is calculated to obtain a solution containing 150 to 250 grammes of $TiO_2$ per litre (i. e. 15 to 25%).

In working the process, it is convenient to take approximately 1 part of attacked mass and dissolve in approximately 0.9-1.2 parts of water and at intervals to test the specific gravity of the solution. This should be in the nature of say 45° Bé. to 55° Bé. (i. e. 1.45 to 1.615 Sp. 8.). If the specific gravity is too high, more water is added and if it is too low, more attacked mass is added.

The solution may now be crystallized after clarification when required in the following manner:—

The solution above referred to contains approximately 200 grammes of $TiO_2$ and 400 grammes of $H_2SO_4$ (free from oxide other than $TiO_2$) per litre. If the concentration of sulphuric acid is lower than 500 grammes per litre, as it is in the specific example quoted, more acid is added, but should the concentration be more than 500 grammes of acid per litre, no further acid is added. For every litre of the solution, however, when acid is added, the amount of added acid varies according to its strength. For example, 250 grammes of 100% sulphuric acid would be added, whereas if the added acid was only of 50% strength then it would be necessary to introduce 500 grammes.

The solution of correct concentration is now heated—(if necessary) and is kept at a temperature below its boiling point (between 60° C.–130° C.) until a good crop of crystals results.

In working the process it will be observed at this point that the crystalline salt produced is scarcely soluble in the presence of the excess acid. By filtration, the crystals are separated from the mother liquor, the former being of the formula $TiO\,SO_4\,2H_2O$, and the mother liquor chiefly diluted sulphuric acid. The crystals are then washed if necessary to remove impurities, and either dried and thus may constitute a product, or they may be dissolved in water, when a solution nearly free from Tyndall effects is obtained, that is, it is a solution substantially of crystalloid and not colloidal substance. The solutions in question do not become opalescent even when highly diluted with distilled water to, for example, 100 or even 1000 times their own volume. The crystalloid solution prepared from the titaniferous material by way of crystallization may, if desired, be hydrolyzed in the manner indicated in co-pending application No. 709,671.

This case is in part a continuation of Serial No. 652,187, filed July 17, 1923.

Having now described my invention what I claim as new and desire to secure by Letters Patent is:—

1. In the process of producing crystalline titanyl sulphate from material containing titanium, the steps of mixing the said material with sulphuric acid, heating the mixture initially to a temperature of at least 130° C. and gradually increasing the temperature to a maximum of 220° C.

2. The production of crystalline titanyl sulphate by treating the solution resulting from the process claimed in claim 1, at temperatures between 60° C. and 130° C., the strength of acid being, during such operation, greater than 500 grammes per litre, and separating the crystals from the mother liquor.

3. In the production of titanium compounds from materials containing titanium oxide, the process which comprises reacting on titanium oxide material with sulphuric acid, heating the mixture initially to at least 130° C., and thereafter gradually increasing the temperature, treating the resulting mass with water in proportion to yield a solution having a $TiO_2$ concentration of about 45 to 55° Bé., maintaining such solution, while containing not substantially below 500 grams of sulfuric acid per litre, at a temperature between about 60° C. and its boiling point, until a substantial crop of crystals of titanyl sulfate is produced, which crystals are readily soluble in water but not readily soluble in dilute sulfuric acid, and thereafter dissolving said crystals in water to produce a solution substantially free from Tyndall effect.

4. In the production of titanium compounds from materials containing titanium oxide, the process which comprises reacting on titanium oxide material with sulphuric acid, heating the mixture initially to at least 130° C., and thereafter gradually increasing the temperature, treating the resulting mass with water in proportion to yield a solution having a $TiO_2$ concentration of about 45 to 55° Bé., maintaining such solution, while containing not substantially below 500 grams of sulfuric acid per litre, at a temperature between about 60° C. and its boiling point, until a substantial crop of crystals of titanyl sulfate is produced.

In testimony whereof I have signed my name to this specification.

JOSEPH BLUMENFELD.